(12) United States Patent
Saeki

(10) Patent No.: US 9,676,268 B2
(45) Date of Patent: Jun. 13, 2017

(54) VEHICLE FRONT SECTION STRUCTURE

(71) Applicant: TOYOTA JIDOSHA KABUSHIKI KAISHA, Toyota-shi (JP)

(72) Inventor: Koji Saeki, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/802,346

(22) Filed: Jul. 17, 2015

(65) Prior Publication Data

US 2016/0068057 A1 Mar. 10, 2016

(30) Foreign Application Priority Data

Sep. 9, 2014 (JP) .................................. 2014-183465

(51) Int. Cl.
*B60K 11/04* (2006.01)
*B60R 19/12* (2006.01)
*B60R 19/34* (2006.01)

(52) U.S. Cl.
CPC .............. *B60K 11/04* (2013.01); *B60R 19/12* (2013.01); *B60R 19/34* (2013.01); *B60Y 2306/01* (2013.01)

(58) Field of Classification Search
None
See application file for complete search history.

(56) References Cited

FOREIGN PATENT DOCUMENTS

| JP | 2006-76455 A | | 3/2006 |
| JP | 2007-137224 | | 6/2007 |
| JP | 2007137224 A | * | 6/2007 |

* cited by examiner

*Primary Examiner* — John Walters
*Assistant Examiner* — Hilary L Johns
(74) *Attorney, Agent, or Firm* — Oblon, McClelland, Maier & Neustadt, L.L.P.

(57) ABSTRACT

The present disclosure provides a vehicle front section structure including: a front side member that extends along a vehicle front-rear direction; a radiator support that is formed in a rectangular frame shape as viewed from a front of the vehicle and is joined to the front side member at a side radiator support configuring a side portion of the radiator support extending along a vehicle up-down direction; and a lower member that extends along the vehicle front-rear direction, that is joined to a vehicle lower side end portion of the radiator support, and that, at a join portion joined with the radiator support, is provided with a deformation origin portion that lets the join portion undergo bending deformation toward a top of the vehicle in a case in which load is input from the front of the vehicle.

10 Claims, 5 Drawing Sheets

VEHICLE FRONT SECTION STRUCTURE

CROSS-REFERENCE TO RELATED APPLICATION

This application claims priority under 35 USC 119 from Japanese Patent Application No. 2014-183465, filed on Sep. 9, 2014 the disclosure of which is incorporated by reference herein.

BACKGROUND

Technical Field

The present disclosure relates to a vehicle front section structure.

Related Art

As a vehicle front section structure including front side members extending along a vehicle front-rear direction at both vehicle width direction sides of a vehicle front section, Japanese Patent Application Laid-Open (JP-A) No. 2007-137224 describes a structure in which a radiator support that supports a radiator is disposed between a pair of front side members. Side rails (lower members) are disposed extending along the vehicle front-rear direction lower down in the vehicle than the front side members, and the side rails are coupled to the radiator support by brackets.

In Japanese Patent Application Laid-Open (JP-A) No. 2007-137224, the rigidity of the vehicle front section is raised by coupling the front side members and the side rails (lower members) together through the radiator support. However, there is still room for further improvement with regard to effectively transmitting to the radiator support, collision load that is input from the vehicle front in, for example, a front end collision of the vehicle.

SUMMARY

The present disclosure provides a vehicle front section structure enabling collision load input during a front end collision to be effectively transmitted to a radiator support.

A first aspect is a vehicle front section structure including: a front side member, disposed at a vehicle width direction outside of a front section of a vehicle, that extends along a vehicle front-rear direction; a radiator support, disposed at a vehicle width direction inside of the front side member, that is formed in a rectangular frame shape as viewed from a front of the vehicle and is joined to the front side member at a side radiator support configuring a side portion of the radiator support extending along a vehicle up-down direction; and a lower member, disposed lower down in the vehicle than the front side member, that extends along the vehicle front-rear direction, that is joined to a vehicle lower side end portion of the radiator support, and that, at a join portion joined with the radiator support, is provided with a deformation origin portion that lets the join portion undergo bending deformation toward a top of the vehicle in a case in which load is input from the front of the vehicle.

In the vehicle front section structure according to the first aspect, the front side member is disposed extending in the vehicle front-rear direction at the vehicle width direction outside of the vehicle front section, and the radiator support is disposed at the vehicle width direction inside of the front side member. The side radiator support configuring the side portion of the radiator support is joined to the front side member. The lower member is disposed extending along the vehicle front-rear direction, lower down in the vehicle than the front side member, and the lower member is joined to the vehicle lower side end portion of the radiator support. The front side member and the lower member are accordingly coupled together by the radiator support, thereby enabling increased rigidity of the vehicle front section.

The join portion of the lower member with the radiator support is provided with the deformation origin portion, and configuration is made such that in a case in which load is input from the vehicle front, the join portion undergoes bending deformation toward the top of the vehicle due to the deformation origin portion. Accordingly, in the case in which collision load is input from the vehicle front in a front end collision of the vehicle or the like, part of the collision load is transmitted toward the vehicle rear through the front side member and the lower member. Note that, since the join portion of the lower member to the radiator support undergoes bending deformation toward the top of the vehicle, part of the collision load input to the lower member may be transmitted to the radiator support.

In a front end collision, the lower member undergoes bending deformation toward the top of the vehicle due to the deformation origin portion, thereby enabling the lower member to be suppressed from affecting peripheral components due to deforming in other, unintended, directions.

A second aspect, in the above first aspect, the deformation origin portion may be a weakened portion formed to the lower member at a vehicle lower side of the join portion.

In the vehicle front section structure according to the second aspect, in a case in which load is input to the lower member from the vehicle front, the vehicle lower side of the lower member is crushed about an origin at the weakened portion. This thereby enables bending deformation toward the top of the vehicle to be induced in the lower member.

A third aspect, in the above aspects, a lower bumper reinforcement may be disposed with its length direction along the vehicle width direction at a vehicle front side end portion of the lower member; and a load input position, where load is input to the lower bumper reinforcement during a front end collision, may be positioned lower down in the vehicle than a centroid of the lower member as viewed from in front of the vehicle.

In the vehicle front section structure according to the third aspect, in a case in which collision load is input to the load input position of the lower bumper reinforcement during a front end collision of the vehicle, moment toward the vehicle lower side of the lower member acts on the lower bumper reinforcement. Accordingly, vehicle upper side moment acts on the lower member at the join portion with the radiator support, allowing the join portion to undergo effective bending deformation toward the top of the vehicle.

A fourth aspect, in the above aspects, the lower member may be joined to both a lower radiator support, that configures a vehicle lower side of the radiator support and extends in the vehicle width direction, and to the side radiator support.

The vehicle front section structure according to the fourth aspect enables the radiator support to be suppressed from deforming such that the vehicle upper side and the vehicle lower side of the radiator support are displaced relative to each other as viewed from in front of the vehicle (cross-sectional deformation). Accordingly, the front side member joined to the radiator support may be suppressed from moving and vibrating.

As described above, the vehicle front section structure of the first aspect and the second aspect enable collision load during a front end collision to be effectively transmitted to the radiator support.

The vehicle front section structure of the third aspect enable the lower member to undergo more reliable bending deformation toward the top of the vehicle.

The vehicle front section structure of the fourth aspect enable cross-sectional deformation of the radiator support to be suppressed, while efficiently transmitting collision load to the radiator support.

BRIEF DESCRIPTION OF THE DRAWINGS

Exemplary embodiments will be described in detail based on the following figures, wherein.

DETAILED DESCRIPTION

First Exemplary Embodiment

Explanation follows regarding a vehicle front section structure according to an exemplary embodiment, with reference to FIG. 1 to FIG. 4. In each of the drawings, the arrow FR indicates the vehicle front side, the arrow UP indicates the vehicle upper side, and the arrow LH indicates the vehicle left side in the vehicle width direction, as appropriate. Unless specifically mentioned, in the following explanation, reference to the front and rear, up and down, and left and right refer to the front and rear in the vehicle front-rear direction, up and down in the vehicle up-down direction, and left and right when facing toward the direction of travel.

[Overall Configuration of Vehicle Front Section Structure]

Figure 1:
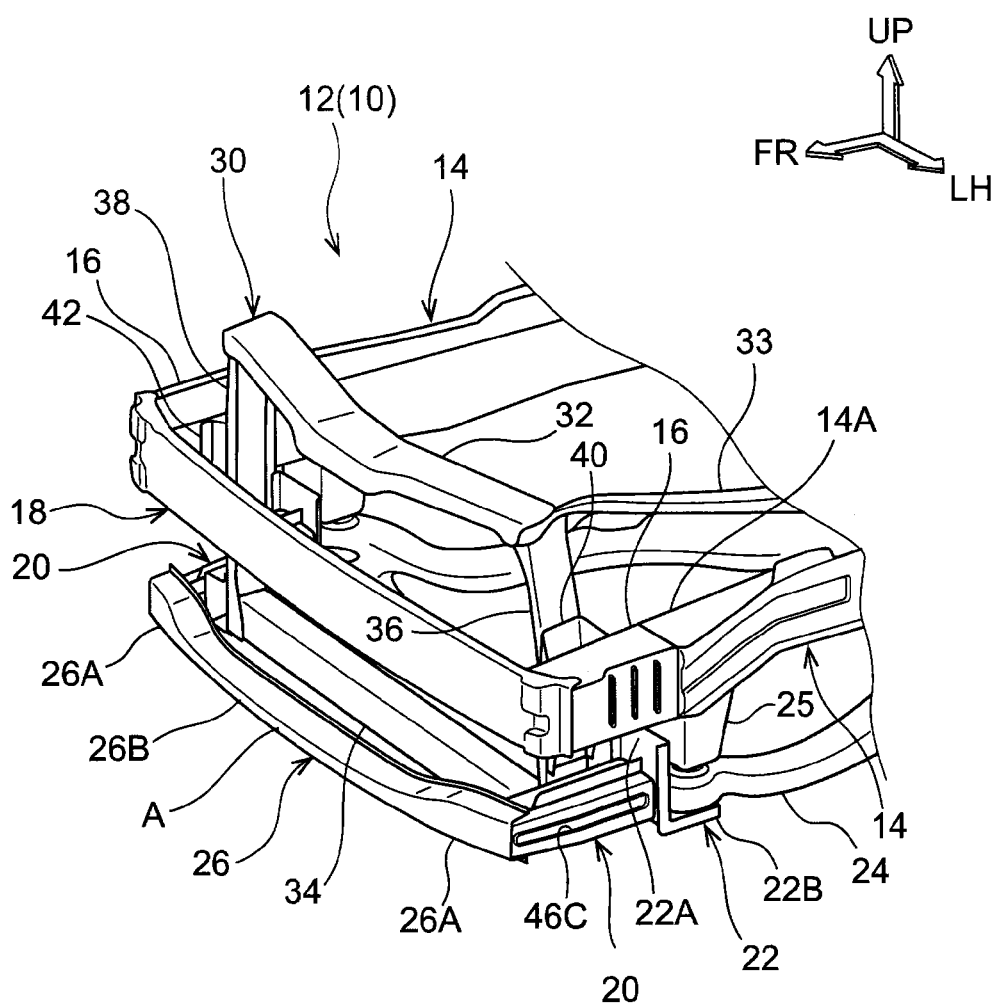
FIG. 1 is a perspective view illustrating a vehicle front section structure according to a first exemplary embodiment.

As illustrated in FIG. 1, a pair of left and right front side members 14 are disposed at vehicle width direction outsides of a vehicle front section 12 of a vehicle 10 applied with a vehicle front section structure according to the present exemplary embodiment. The front side members 14 extend along the vehicle front-rear direction, and are each configured with a substantially rectangular shaped closed cross-section structure as taken from top to bottom along the vehicle width direction.

A vehicle front side end portion 14A (front end portion 14A) of each of the front side members 14 is formed with greater length in the vehicle width direction than a general portion of the front side members 14, and a crash box 16 is joined to each front end portion 14A using nuts and bolts (not illustrated) or the like. The crash boxes 16 extend in the vehicle front-rear direction contiguously to the front side members 14, and are each configured with a substantially rectangular shaped closed cross-section structure as taken from top to bottom along the vehicle width direction. The crash boxes 16 are set with lower compression strength in the vehicle front-rear direction than the front side members 14, and are configured to be capable of absorbing collision energy in a front end collision of the vehicle 10.

Bumper reinforcement 18 is disposed at front end portions of the crash boxes 16 with its length direction along the vehicle width direction. The bumper reinforcement 18 is formed with a substantially rectangular columnar profile, is disposed with its length direction along the vehicle width direction, and spans between the pair of left and right front side members 14. The bumper reinforcement 18 is curved such that in plan view, a vehicle width direction central portion is positioned further to the vehicle front than both vehicle width direction end portions. Both vehicle width direction end portions of the bumper reinforcement 18 extend further to the vehicle width direction outsides than the front side members 14.

Pair of left and right lower members 20 are disposed lower down in the vehicle than the front side members 14. Each of the lower members 20 is provided substantially parallel to the respective front side member 14, extends along the vehicle front-rear direction, and has a substantially rectangular shaped closed cross-section structure as taken from top to bottom along the vehicle width direction. Each of the lower members 20 is formed with a folding bead 46D serving as a deformation origin portion (weakened portion) (see FIG. 4). Detailed explanation regarding the lower members 20 and the folding bead 46D will be given later.

Figure 2:
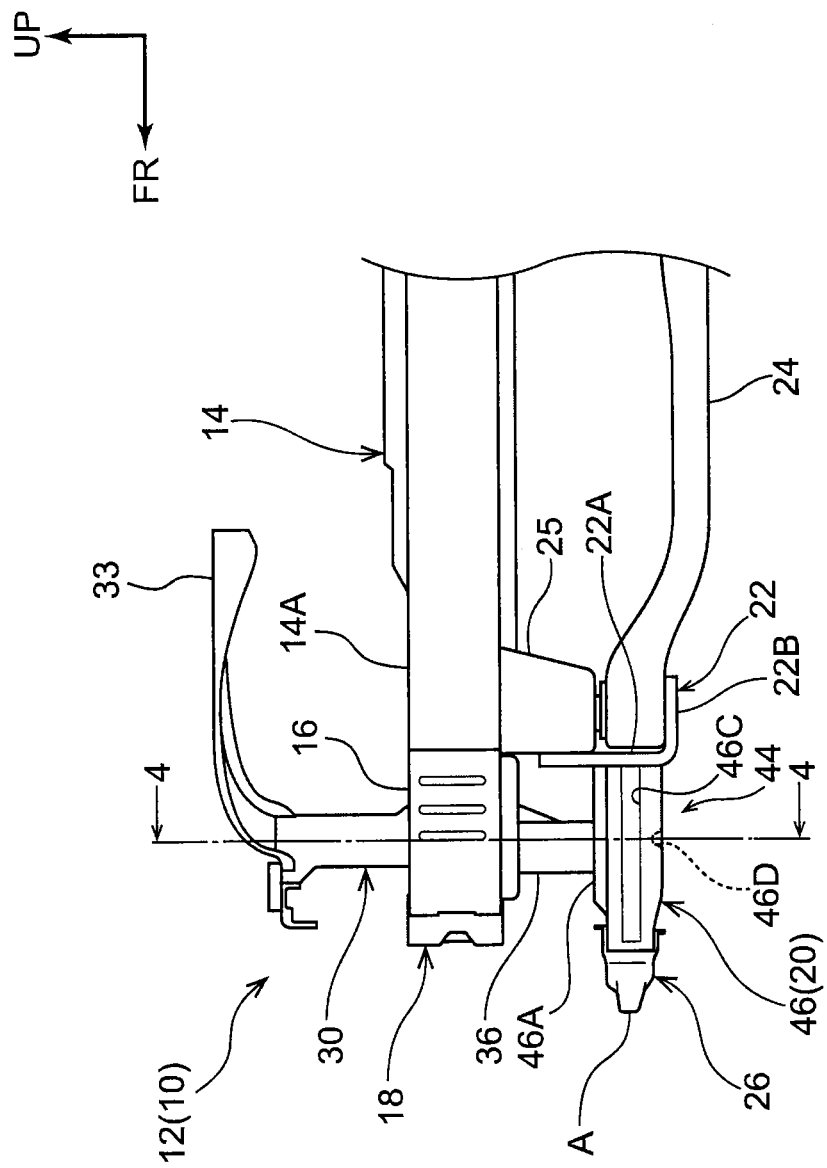
FIG. 2 is a side view illustrating a vehicle front section structure according to the first exemplary embodiment.

As illustrated in FIG. 1 and FIG. 2, an L-bracket 22, that has a substantially L-shape as viewed from the side of the vehicle, is provided to a vehicle rear side end portion (rear end portion) of each of the lower members 20. Each L-bracket 22 is configured including an upright wall 22A extending in the vehicle up-down direction facing the rear end portion of the lower member 20, and a horizontal wall 22B extending from a lower end portion of the upright wall 22A toward the vehicle rear. The rear end portion of the lower member 20 is joined to the upright wall 22A by nuts and bolts (not illustrated), or the like. Moreover, the horizontal wall 22B of the L-bracket 22 supports a front end portion of a suspension member 24, and the front end portion of the suspension member 24 is coupled to a lower face of the front side member 14 in the vehicle up-down direction through a bracket 25.

Lower bumper reinforcement 26, with its length direction along the vehicle width direction, is disposed at front end portions of the lower members 20. The lower bumper reinforcement 26 is formed with a substantially rectangular columnar profile, disposed with its length direction along the vehicle width direction, and spans between the pair of left and right lower members 20.

The lower bumper reinforcement 26 is curved such that a vehicle width direction central portion 26B is positioned further toward the vehicle front than both vehicle width direction end portions 26A in plan view. Both vehicle width direction end portions 26A of the lower bumper reinforcement 26 extend out further to the vehicle width direction outsides than the lower members 20. The vehicle width direction central portion 26B of the lower bumper reinforcement 26 is positioned lower in the vehicle than both vehicle width direction end portions 26A.

Figure 3:
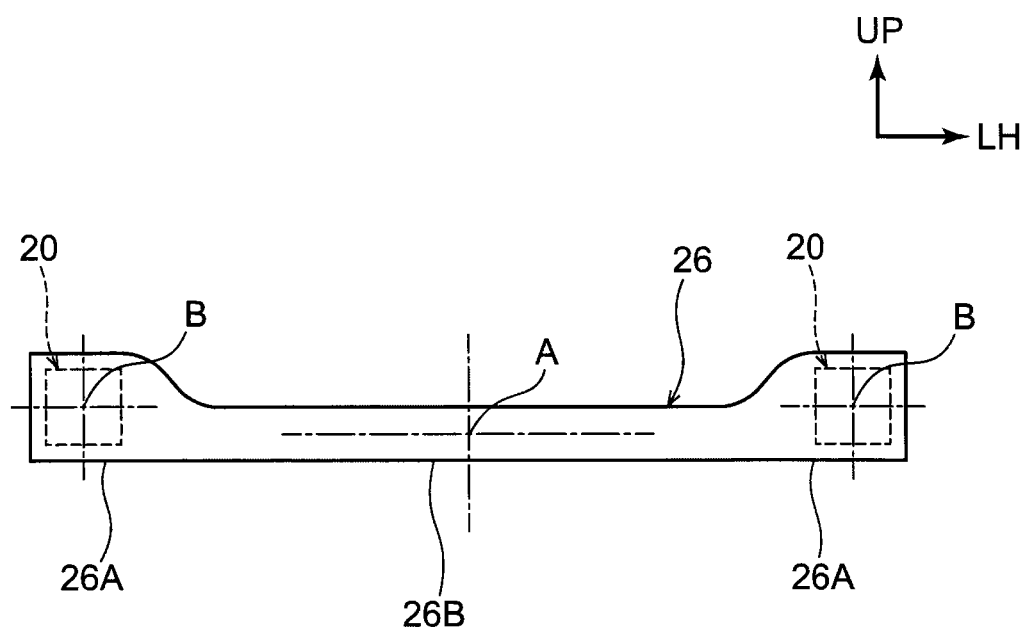
FIG. 3 is a schematic front view illustrating a positional relationship between lower bumper reinforcement and lower members according to the first exemplary embodiment, as viewed from in front of the vehicle.

As illustrated in FIG. 3, the vehicle width direction central portion 26B of the lower bumper reinforcement 26 is set at a load input position A where load is input during, for example, a front end collision of the vehicle 10. As an example, in the present exemplary embodiment, the load input position A is at the center of the vehicle width direction central portion 26B of the lower bumper reinforcement 26. The load input position A is positioned lower in the vehicle than centroids B of the lower members 20, as viewed from in front of the vehicle. In a case in which load is input at the load input position A in a front end collision of the vehicle 10, for example, moment toward the vehicle lower side of the lower members 20 acts on the lower bumper reinforcement 26. Configuration is made such that moment toward the vehicle upper side acts on the lower members 20, and the lower member 20 readily deforms so as to bulge toward the top of the vehicle (referred to upward bulge folding).

As illustrated in FIG. 1, a radiator support 30 that supports a radiator (not illustrated), is disposed at the vehicle width direction inside of the front side members 14 and the lower members 20. The radiator support 30 is formed in a substantially rectangular frame shape as viewed from in front of the vehicle, and is configured including an upper radiator support 32 extending along the vehicle width direction at a vehicle upper side, a lower radiator support 34 extending along the vehicle width direction below the upper radiator support 32, and a side radiator support 36 and a side radiator support 38, configuring respective side portions that couple together both end portions of the respective upper radiator support 32 and lower radiator support 34 from top to bottom.

The upper radiator support 32 is an elongated metal member extending along the vehicle width direction, with a cross-section profile formed in a substantially U-shape open toward the vehicle lower side as taken from top to bottom along the vehicle front-rear direction. The upper radiator support 32 is formed with plural attachment holes (not illustrated) for fixing the radiator (not illustrated). Moreover, one end portions of coupling members 33, each coupled to an apron upper member (not illustrated), are joined to both vehicle width direction end portions of the upper radiator support 32 (only the coupling member 33 on the left side of the vehicle is illustrated in FIG. 1). An upper end portion of the side radiator support 36 is joined to the vehicle left side end portion of the upper radiator support 32, and an upper end portion of the side radiator support 38 is joined to the vehicle right side end portion of the upper radiator support 32.

The lower radiator support 34 is an elongated metal member disposed substantially parallel to the upper radiator support 32, and is configured with a substantially rectangular shaped closed cross-section structure as taken from top to bottom along the vehicle front-rear direction. A lower end portion of the side radiator support 36 is joined to a vehicle left side end portion of the lower radiator support 34, and a lower end portion of the side radiator support 38 is joined to a vehicle right side end portion of the lower radiator support 34.

The side radiator support 36 and the side radiator support 38 are each elongated metal members, and are formed with a substantially U-shaped cross-section profile open toward the vehicle width direction inside as taken along the vehicle width direction. The front side member 14 (crash box 16) on the left side of the vehicle is joined by a coupling bracket 40 to the vehicle width direction outside of a vehicle up-down direction central portion of the side radiator support 36 using nuts and bolts (not illustrated), or the like. Similarly, the front side member 14 (crash box 16) on the right side of the vehicle is joined by a coupling bracket 42 to the vehicle width direction outside of a vehicle up-down direction central portion of the side radiator support 38 using nuts and bolts (not illustrated).

Figure 4:
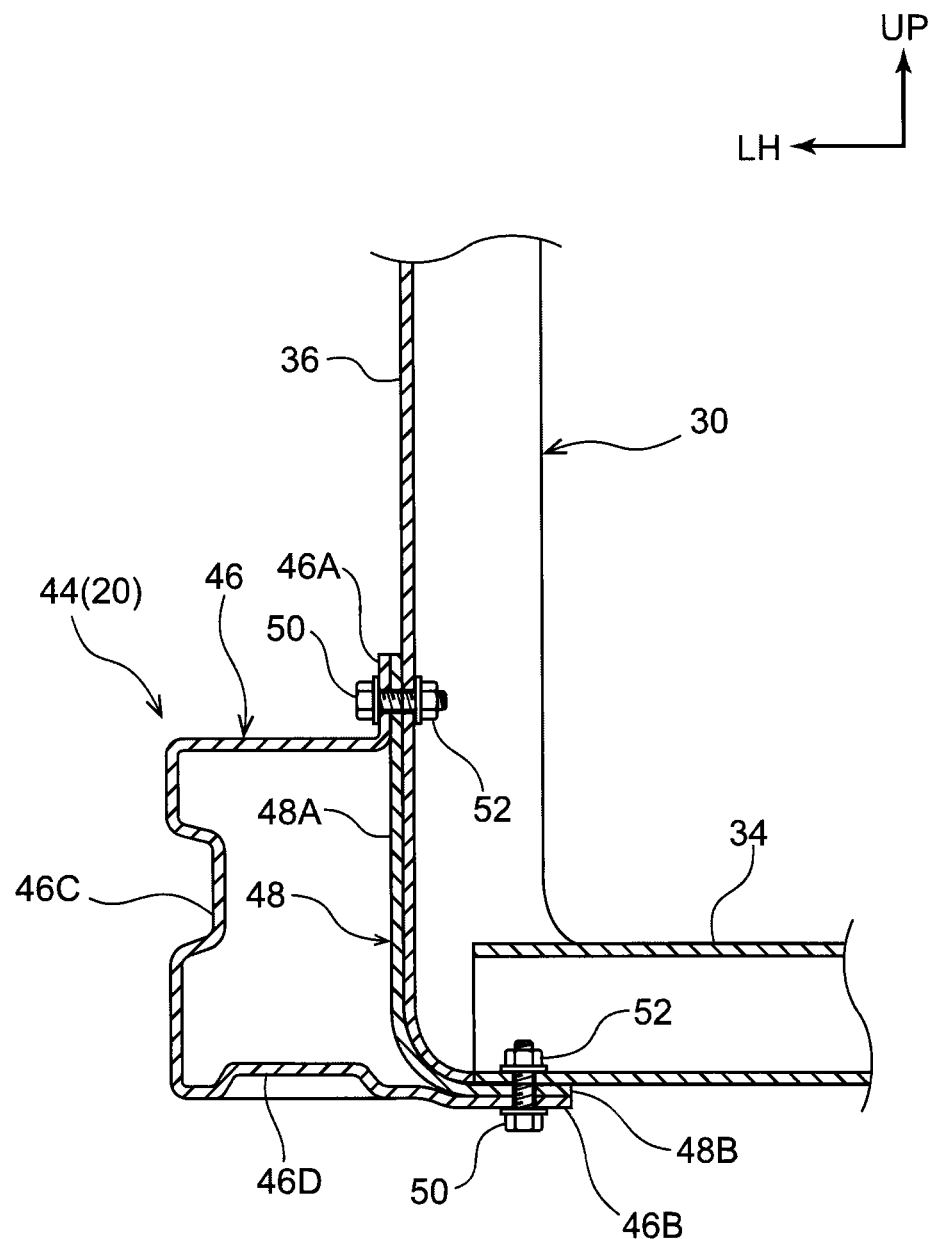
FIG. 4 is an enlarged cross-section taken along line 4-4 in FIG. 2.

As illustrated in FIG. 4, the lower member 20 is joined to the vehicle width direction outside of a lower end portion of the side radiator support 36. The lower member 20 is configured including an outer panel 46 on the vehicle width direction outside, and an inner panel 48 on the vehicle width direction inside. The outer panel 46 and the inner panel 48 are fastened together using bolts 50 and nuts 52 at a join portion 44 between the lower member 20 and the radiator support 30 to configure the lower member 20.

The outer panel 46 is formed with a substantially U-shaped cross-section profile open toward the vehicle width direction inside as taken from top to bottom along the vehicle width direction. A vehicle width direction inside of an upper end portion of the outer panel 46 extends toward the top of the vehicle along the side radiator support 36 to configure an upper side flange 46A. A vehicle width direction inside of a lower end portion of the outer panel 46 extends toward the vehicle width direction inside along the lower radiator support 34 to configure a lower side flange 46B.

An indented bead 46C is formed by indenting the outer panel 46 toward the vehicle width direction inside at a vehicle up-down direction central portion on the vehicle width direction outside of the outer panel 46. As illustrated in FIG. 2, the indented bead 46C extends along the vehicle front-rear direction, spanning from a front end portion to a rear end portion of the lower member 20.

As illustrated in FIG. 4, a vehicle width direction central portion at a vehicle lower side of the outer panel 46 is provided with the folding bead 46D as a weakened portion. The folding bead 46D is formed by indenting the outer panel 46 toward the top of the vehicle, and as illustrated in FIG. 2, the folding bead 46D is provided at the join portion 44 with the radiator support 30 as viewed from the side of the vehicle. The folding bead 46D is configured such that, in a case in which load is input from the vehicle front, a lower face of the outer panel 46 (lower member 20) is crushed about an origin at the folding bead 46D, and the join portion 44 of the lower member 20 to the radiator support 30 undergoes bending deformation toward the top of the vehicle.

As illustrated in FIG. 4, the inner panel 48 is configured with a substantially L-shaped cross-section profile cut away from top to bottom along the vehicle width direction. The inner panel 48 is configured including an upright wall 48A extending along the vehicle up-down direction following the side radiator support 36, and a horizontal wall 48B extending along the vehicle width direction following the lower radiator support 34.

An upper end portion of the upright wall 48A is overlaid with the upper side flange 46A of the outer panel 46 at the vehicle width direction outside, and fastened together with the side radiator support 36 by the bolt 50 and the nut 52. In other words, an upper end portion of the lower member 20 is joined to the side radiator support 36. The horizontal wall 48B is overlaid with the lower side flange 46B of the outer panel 46 at the vehicle lower side, and fastened together with the lower radiator support 34 using the bolt 50 and the nut 52. In other words, a lower end portion of the lower member 20 is joined to the lower radiator support 34. The lower member 20 is thus joined to both the side radiator support 36 and the lower radiator support 34 as described above.

Although detailed explanation is not given, the lower member 20 on the vehicle right side has a similar configuration. Namely, the upper end portion of the lower member 20 on the vehicle right side is joined to the side radiator support 38 on the vehicle right side, and a lower end portion of the lower member 20 is joined to the lower radiator support 34. A folding bead is also provided as a weakened portion on the lower member 20 on the vehicle right side.

Next, explanation follows regarding operation and effects of the vehicle front section structure of the present exemplary embodiment.

As illustrated in FIG. 1, in the present exemplary embodiment, the bumper reinforcement 18 is provided at the front end portions of the front side members 14, and the lower bumper reinforcement 26 is provided at the front end portions of the lower members 20 that are disposed lower down in the vehicle than the front side members 14. The radiator support 30 is joined to the vehicle width direction insides of the front side members 14 and the lower members 20, thereby enabling the rigidity of the vehicle front section 12 to be increased. In the event of a front end collision of the vehicle 10, collision load is input to the bumper reinforcement 18 and the lower bumper reinforcement 26, thereby enabling better dispersion and transmission of the collision load than in a configuration provided with only the bumper reinforcement 18.

As illustrated in FIG. 2 and FIG. 4, the join portion 44 of the lower member 20 to the radiator support 30 is provided with the folding bead 46D. Accordingly, in a case in which collision load is input to the lower member 20 during a front end collision of the vehicle 10, the vehicle lower side of the lower member 20 is crushed about an origin at the folding bead 46D. This thereby enables bending deformation of the lower member 20 toward the top of the vehicle to be induced. Accordingly, the lower member 20 undergoes bending deformation toward the top of the vehicle at the join portion 44, thus enabling part of the collision load input to the lower member 20 to be effectively transmitted to the side radiator support 36 and the side radiator support 38.

In the present exemplary embodiment, as illustrated in FIG. 3, the load input position A is positioned lower down in the vehicle than the centroids B of the lower members 20 as viewed from in front of the vehicle. In a case in which collision load is input to the lower bumper reinforcement 26, moment toward the vehicle lower side of the lower members 20 accordingly acts on the lower bumper reinforcement 26. Vehicle upper side moment thereby acts on the lower members 20, promoting deformation of each lower member 20 to form a bulge toward the top of the vehicle (referred to as an upward bulge folding). This enables the join portion 44 of the lower member 20 to the radiator support 30 to undergo more reliable bending deformation toward the top of the vehicle. Moreover, a greater amount of the collision load may be transmitted to the radiator support 30.

Transmitting part of the collision load in a front end collision through the radiator support 30 as described above reduces the collision load borne by the front side members 14, the lower members 20, and the like. Namely, energy absorption performance of the vehicle front section 12 in a collision may be improved.

In the present exemplary embodiment, inducing bending deformation of the lower members 20 toward the top of the vehicle enables the lower members 20 to be suppressed from affecting peripheral components due to deformation in other, unintended, directions.

In the present exemplary embodiment, as illustrated in FIG. 4, the upper end portions of the lower members 20 are joined to the side radiator support 36 (side radiator support 38), and the vehicle lower sides of the lower members 20 are joined to the lower radiator support 34. Namely, each lower member 20 is joined to two faces, these being a side face and a lower face, of the respective radiator support 30. This thereby enables the radiator support 30 to be suppressed from deforming such that the vehicle upper side and the vehicle lower side of the radiator support 30 are displaced relative to each other as viewed from in front of the vehicle (cross-sectional deformation). The front side members 14 joined to the radiator support 30 may moreover be suppressed from moving and vibrating.

In the present exemplary embodiment, the folding bead 46D is provided to the lower face of each lower member 20 as a weakened portion; however the number of the folding beads 46D is not particularly limited, and for example, plural of the folding beads 46D may be provided. The profile and depth of the folding bead 46D is also not particularly limited. For example, the folding bead 46D may be extended across the entire lower member 20 in the vehicle width direction, in order to facilitate the inducement of bending deformation of the lower member 20 toward the top of the vehicle. Another configuration may also be employed as a weakened portion. For example, the lower faces of the lower member 20 may be configured formed with plural through holes, such that the vehicle lower side of the lower member 20 is crushed about an origin of the through holes, or a combination of such configurations may be employed.

In the present exemplary embodiment, the folding bead 46D (weakened portion) is provided as a deformation origin portion; however there is no limitation thereto, and other deformation origin portions may be provided. For example, a vehicle upper side of the lower member 20 may be configured reinforced by a reinforcement member or the like. In such cases, the vehicle lower side of the lower member 20 is crushed by collision load, enabling bending deformation of the lower member 20 toward the top of the vehicle to be induced. As another deformation origin portion, the overall lower member 20 may be curved toward the top of the vehicle at the join portion 44, with this curved portion configuring a deformation origin portion. In such cases, a compression force acts on the lower member 20 along the vehicle front-rear direction in the event of a front end collision of the vehicle 10, for example, thereby enabling the lower member 20 to be folded toward the top of the vehicle at the location provided with the curved portion (the join portion 44).

In the present exemplary embodiment, the load input position A of the lower bumper reinforcement 26 is configured at a position lower down in the vehicle than the centroids B of the lower members 20 as viewed from in front of the vehicle; however there is no limitation thereto. Namely, in cases in which effective load transmission to the radiator support 30 is enabled by providing the folding beads 46D to the lower members 20, the load input position A may be at the same height as the centroids B of the lower members 20, or may be positioned higher up in the vehicle than the centroids B. Although such cases are not encompassed by the third aspect, they are encompassed by the first aspect.

In the present exemplary embodiment, each lower member 20 is joined to two faces of the radiator support 30; however there is no limitation thereto. Namely, in cases in which consideration does not need to be given to cross-sectional deformation of the radiator support 30, the lower member 20 may be configured joined to a side face (the side radiator support 36) or a lower face (the lower radiator support 34) of the radiator support 30 alone. Although such cases are not encompassed by the forth aspect, they are encompassed by the first aspect.

As illustrated in FIG. 4, in the present exemplary embodiment, each lower member 20 is disposed at the vehicle width direction outside of a lower end portion of the radiator support 30; however there is no limitation thereto, and the lower member 20 may be disposed at another location. For example, the lower members 20 may be disposed lower down in the vehicle than both vehicle width direction end portions of the lower radiator support 34. In such cases, the vehicle width direction center of the lower member 20 is positioned close to the vehicle width direction center of the side radiator support 36, thereby enabling collision load to be efficiently transmitted toward the top of the vehicle through the side radiator support 36 in a case in which the lower member 20 undergoes bending deformation toward the top of the vehicle.

In the present exemplary embodiment, the vehicle left side and the vehicle right side of the vehicle front section 12 have the same structure as each other; however there is no limitation thereto, and they may have different structures. For example, the folding bead 46D may be set in the lower member 20 on the left side of the vehicle alone, and another structure may be employed in the lower member 20 on the right side of the vehicle, without providing the folding bead 46D.

Second Exemplary Embodiment

Figure 5:
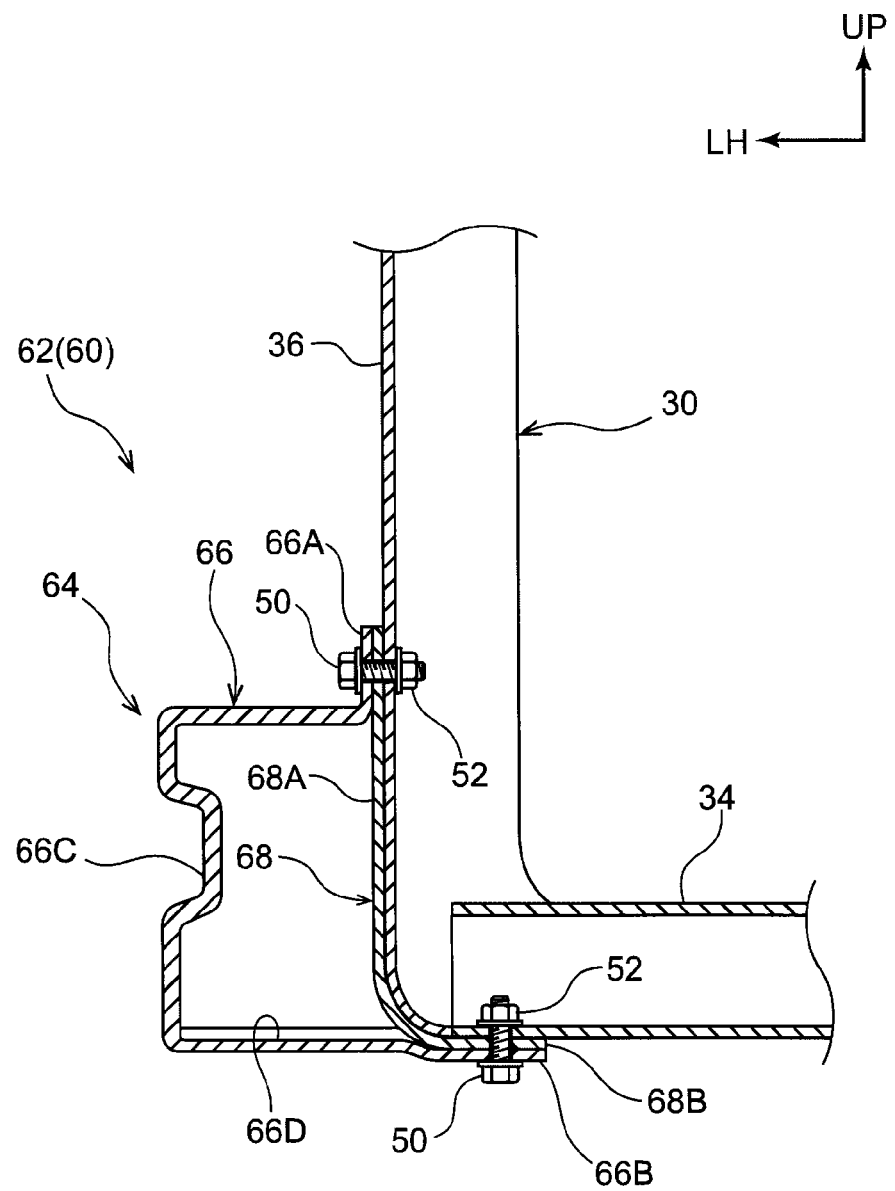
FIG. 5 is an enlarged cross-section corresponding to FIG. 4, illustrating relevant portions of a vehicle front section structure according to a second exemplary embodiment.

Next, explanation follows regarding a vehicle front section structure according to a second exemplary embodiment of the present invention, with reference to FIG. 5. A feature of the vehicle front section structure of the present exemplary embodiment is that the plate thickness of a join portion of the lower member 20 to the radiator support 30 is modified. Note that configurations similar to that of the first exemplary embodiment are allocated the same reference numerals, and explanation thereof is omitted where appropriate.

As illustrated in FIG. 5, the radiator support 30 is disposed in a vehicle front section 62 of a vehicle 60 applied with the vehicle front section structure of the present exemplary embodiment, and a lower member 64 is joined to a lower end portion of the radiator support 30.

The lower member 64 extends along the vehicle front-rear direction, and has a substantially rectangular shaped closed cross-section structure as taken from top to bottom along the vehicle width direction. The lower member 64 is configured including an outer panel 66 on the vehicle width direction outside, and an inner panel 68 on the vehicle width direction inside.

The outer panel 66 is configured with a substantially U-shaped cross-section profile open toward the vehicle width direction inside as taken from top to bottom along the vehicle width direction. A vehicle width direction inside of an upper end portion of the outer panel 66 extends toward the top of the vehicle along the side radiator support 36 to configure an upper side flange 66A. A vehicle width direction inside of a lower end portion of the outer panel 66 extends toward the vehicle width direction inside along the lower radiator support 34, to configure a lower side flange 66B.

An indented bead 66C, indented toward the inside, is formed at a vehicle up-down direction central portion on the vehicle width direction outside of the outer panel 66. The indented bead 66C extends along the vehicle front-rear direction, spanning from a front end portion to a rear end portion of the lower member 64.

A thinned plate portion 66D, serving as a deformation origin portion (weakened portion), is provided at the vehicle lower side of the outer panel 66. The thinned plate portion 66D is only provided at the join portion with the radiator support 30, and is formed with a thinner plate thickness than a general portion of a lower face of the outer panel 66. Accordingly, configuration is made such that in a case in which load is input from the vehicle front, the thinned plate portion 66D is crushed, and the join portion of the lower member 64 to the radiator support 30 undergoes bending deformation toward the top of the vehicle.

The inner panel 68 is formed with a substantially L-shaped cross-section profile as taken from top to bottom along the vehicle width direction, and is configured including an upright wall 68A and a horizontal wall 68B. An upper end portion of the upright wall 68A is overlaid with the upper side flange 66A, and fastened together with the side radiator support 36 by the bolt 50 and the nut 52. A lower side of the horizontal wall 68B is overlaid with the lower side flange 66B, and fastened together to the lower radiator support 34 by the bolt 50 and the nut 52.

Note that in the present exemplary embodiment, explanation has been given regarding the lower member 64 on the left side of the vehicle; however a lower member on the right side of the vehicle has similar configuration.

Next, explanation follows regarding operation and advantageous effects of the vehicle front section structure of the present exemplary embodiment.

In the vehicle 60 applied with the vehicle front section structure of the present exemplary embodiment, in a case in which collision load is input to the lower member 64 from the front of the vehicle in the event of a front end collision, the low strength thinned plate portion 66D is crushed. The lower member 64 accordingly undergoes bending deformation toward the top of the vehicle at the position joined to the radiator support 30, enabling part of the collision load to be effectively transmitted to the radiator support 30. Operation is otherwise similar to that of the first exemplary embodiment.

Explanation has been given regarding the vehicle front section structures according to the first exemplary embodiment and the second exemplary embodiment of the present invention; however various embodiments may obviously be implemented within a range not departing from the spirit of the present invention. For example, one of a pair of left and right lower members may be set with a folding bead with a structure similar to that illustrated in FIG. 4, and the other lower member may be set with a thinned plate portion similar to that illustrated in FIG. 5.

What is claimed is:

1. A vehicle front section structure comprising:
    a front side member, disposed at a vehicle width direction outside of a front section of a vehicle, that extends along a vehicle front-rear direction;
    a radiator support, disposed at a vehicle width direction inside of the front side member, that is formed in a rectangular frame shape as viewed from a front of the vehicle and is joined to the front side member at a side radiator support configuring a side portion of the radiator support extending along a vehicle up-down direction; and
    a lower member, disposed lower down in the vehicle than the front side member, that extends along the vehicle front-rear direction, that is joined to a vehicle lower side end portion of the radiator support, and that, at a join portion joined with the radiator support, is provided with a deformation origin portion that lets the join portion undergo bending deformation toward a top of the vehicle in a case in which load is input from the front of the vehicle.

2. The vehicle front section structure of claim 1, wherein the deformation origin portion is a weakened portion formed to the lower member at a vehicle lower side of the join portion.

3. The vehicle front section structure of claim 1, wherein:
a lower bumper reinforcement is disposed with its length direction along the vehicle width direction at a vehicle front side end portion of the lower member; and
a load input position, where load is input to the lower bumper reinforcement during a front end collision, is positioned lower down in the vehicle than a centroid of the lower member as viewed from in front of the vehicle.

4. The vehicle front section structure of claim 2, wherein:
a lower bumper reinforcement is disposed with its length direction along the vehicle width direction at a vehicle front side end portion of the lower member; and
a load input position, where load is input to the lower bumper reinforcement during a front end collision, is positioned lower down in the vehicle than a centroid of the lower member as viewed from in front of the vehicle.

5. The vehicle front section structure of claim 1, wherein the lower member is joined to both a lower radiator support, that configures a vehicle lower side of the radiator support and extends in the vehicle width direction, and to the side radiator support.

6. The vehicle front section structure of claim 2, wherein the lower member is joined to both a lower radiator support, that configures a vehicle lower side of the radiator support and extends in the vehicle width direction, and to the side radiator support.

7. The vehicle front section structure of claim 3, wherein the lower member is joined to both a lower radiator support, that configures a vehicle lower side of the radiator support and extends in the vehicle width direction, and to the side radiator support.

8. The vehicle front section structure of claim 1, wherein the deformation origin portion is an indented portion on a lower face of the lower member.

9. The vehicle front section structure of claim 8, wherein the indented portion is indented in a vehicle height direction.

10. The vehicle front section structure of claim 3, wherein the vehicle front side end portion of the lower member and the lower bumper reinforcement are disposed so as to overlap with each other as viewed from the front of the vehicle.

* * * * *